(12) United States Patent
Chen et al.

(10) Patent No.: US 12,397,745 B2
(45) Date of Patent: Aug. 26, 2025

(54) WIRELESS VEHICLE CONTROL DEVICE

(71) Applicants: INVENTEC (PUDONG) TECHNOLOGY CORPORATION, Shanghai (CN); INVENTEC CORPORATION, Taipei (TW)

(72) Inventors: Ting Kai Chen, Taipei (TW); Guan-Jie Jhao, Taipei (TW); Chao Yuan Yu, Taipei (TW); Jung-Pin Wang, Taipei (TW); Che-Yu Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 133 days.

(21) Appl. No.: 18/239,566

(22) Filed: Aug. 29, 2023

(65) Prior Publication Data
US 2024/0391419 A1    Nov. 28, 2024

(30) Foreign Application Priority Data
May 26, 2023   (CN) .......................... 202310609079.7

(51) Int. Cl.
| | | |
|---|---|---|
| B60R 25/20 | (2013.01) | |
| B60R 25/01 | (2013.01) | |
| B60R 25/24 | (2013.01) | |
| G07C 9/00 | (2020.01) | |

(52) U.S. Cl.
CPC .......... *B60R 25/2018* (2013.01); *B60R 25/01* (2013.01); *B60R 25/24* (2013.01); *G07C 9/00309* (2013.01); *B60R 2325/101* (2013.01); *B60R 2325/103* (2013.01); *G07C 2009/00793* (2013.01); *G07C 2209/63* (2013.01)

(58) Field of Classification Search
CPC ..... B60R 25/2018; B60R 25/01; B60R 25/24; B60R 2325/101; B60R 2325/103; G07C 9/00309; G07C 2209/63
See application file for complete search history.

(56) References Cited

U.S. PATENT DOCUMENTS

| | | | |
|---|---|---|---|
| 2013/0176069 A1* | 7/2013 | Leong ................ | G07C 9/00309 327/517 |
| 2018/0151009 A1* | 5/2018 | Kim ................... | G07C 9/00309 |
| 2024/0323644 A1* | 9/2024 | Betz ....................... | H04L 67/52 |

* cited by examiner

*Primary Examiner* — Vernal U Brown
(74) *Attorney, Agent, or Firm* — Maschoff Brennan

(57) ABSTRACT

A wireless vehicle control device, disposed on a vehicle, includes a first communication unit, at least one second communication unit and a central management unit. The first communication unit is configured to detect a first communication signal of a portable electronic device. The at least one second communication unit is configured to detect a second communication signal of the portable electronic device, wherein a communication range of the at least one second communication unit is smaller than that of the first communication unit. The central management unit is configured to activate the at least one second communication unit to perform detection when determining that the first communication unit is paired with the portable electronic device according to the first communication signal, and control at least one vehicle lock according to the first communication signal when a distance corresponding to the second communication signal is not greater than a default distance.

9 Claims, 6 Drawing Sheets

WIRELESS VEHICLE CONTROL DEVICE

CROSS-REFERENCE TO RELATED APPLICATIONS

This non-provisional application claims priority under 35 U.S.C. § 119(a) on Patent Application No(s). 202310609079.7 filed in China on May 26, 2023, the entire contents of which are hereby incorporated by reference.

BACKGROUND

1. Technical Field

This disclosure relates to a vehicle control device, particularly to a wireless vehicle control device.

2. Related Art

The development of in-vehicle systems has become increasingly diverse. Users can now use smart keys to unlock car doors without the need for manual operation. This technology is known as passive entry and passive start (PEPS). With PEPS technology, users can approach the vehicle with the key and simply pull the door handle to open the car door. However, the existing PEPS technology lacks precise distance measurement between the smart key and the vehicle, which can result in the doors unlocked when the user is still far away from the vehicle or require the user to be very close to the door to unlock the door.

SUMMARY

Accordingly, this disclosure provides a wireless vehicle control device.

According to one or more embodiment of this disclosure, a wireless vehicle control device, disposed on a vehicle, includes: a first communication unit, at least one second communication unit and a central management unit. The first communication unit is configured to detect a first communication signal of a portable electronic device. The at least one second communication unit is configured to detect a second communication signal of the portable electronic device, wherein a communication range of the at least one second communication unit is smaller than a communication range of the first communication unit. The central management unit is connected to the first communication unit and the at least one second communication unit, wherein the central management unit is configured to activate the at least one second communication unit to perform detection when determining the first communication unit is paired with the portable electronic device according to the first communication signal, and the central management unit is configured to control at least one vehicle lock according to the first communication signal when a distance corresponding to the second communication signal is not greater than a default distance.

In view of the above description, the wireless vehicle control device according to one or more embodiments of the present disclosure may accurately detect the movement of a pairable portable electronic device to control the vehicle lock based on control signals output by the portable electronic device at an appropriate distance.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
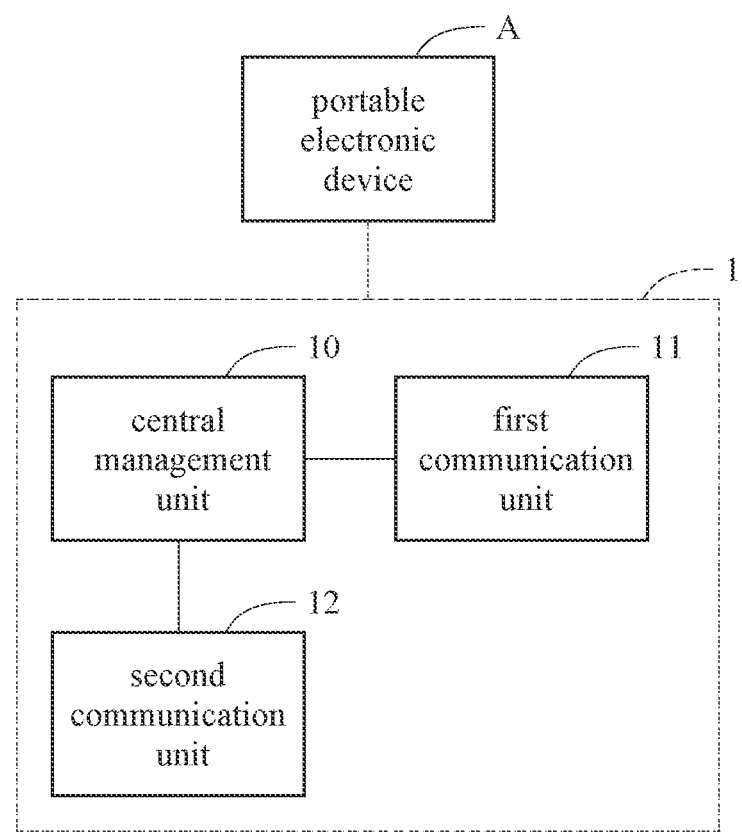
FIG. 1 is a block diagram illustrating a wireless vehicle control device according to an embodiment of the present disclosure.

Please refer to FIG. 1, wherein FIG. 1 is a block diagram illustrating a wireless vehicle control device according to an embodiment of the present disclosure. As shown in FIG. 1, the wireless vehicle control device 1 includes a central management unit 10, a first communication unit 11 and a second communication unit 12. The wireless vehicle control device 1 is disposed on a vehicle. The central management unit 10 is connected to the first communication unit 11 and at least one second communication unit 12. The wireless vehicle control device 1 may be in communication connection with a portable electronic device A. wherein the dotted line between the portable electronic device A and the wireless vehicle control device 1 indicates that the portable electronic device A and the wireless vehicle control device 1 communicate with each other at least when the two are in close proximity to each other.

The central management unit 10 may include one or more processors, said processor is, for example, a central processing unit, a graphics processing unit, a microcontroller, a programmable logic controller or any other processor with signal processing function. A communication range of the second communication unit 12 is smaller than a communication range of the first communication unit 11. For example, the first communication unit 11 may be a Bluetooth transceiver, and the second communication unit 12 may be an ultra-wide band (UWB) transceiver. The portable electronic device A is, for example, a smart key, a smart phone etc. or any other the portable electronic devices equipped with a transceiver using the same communication technology as the first communication unit 11 and a transceiver using the same communication technology as the second communication unit 12

Figure 2:
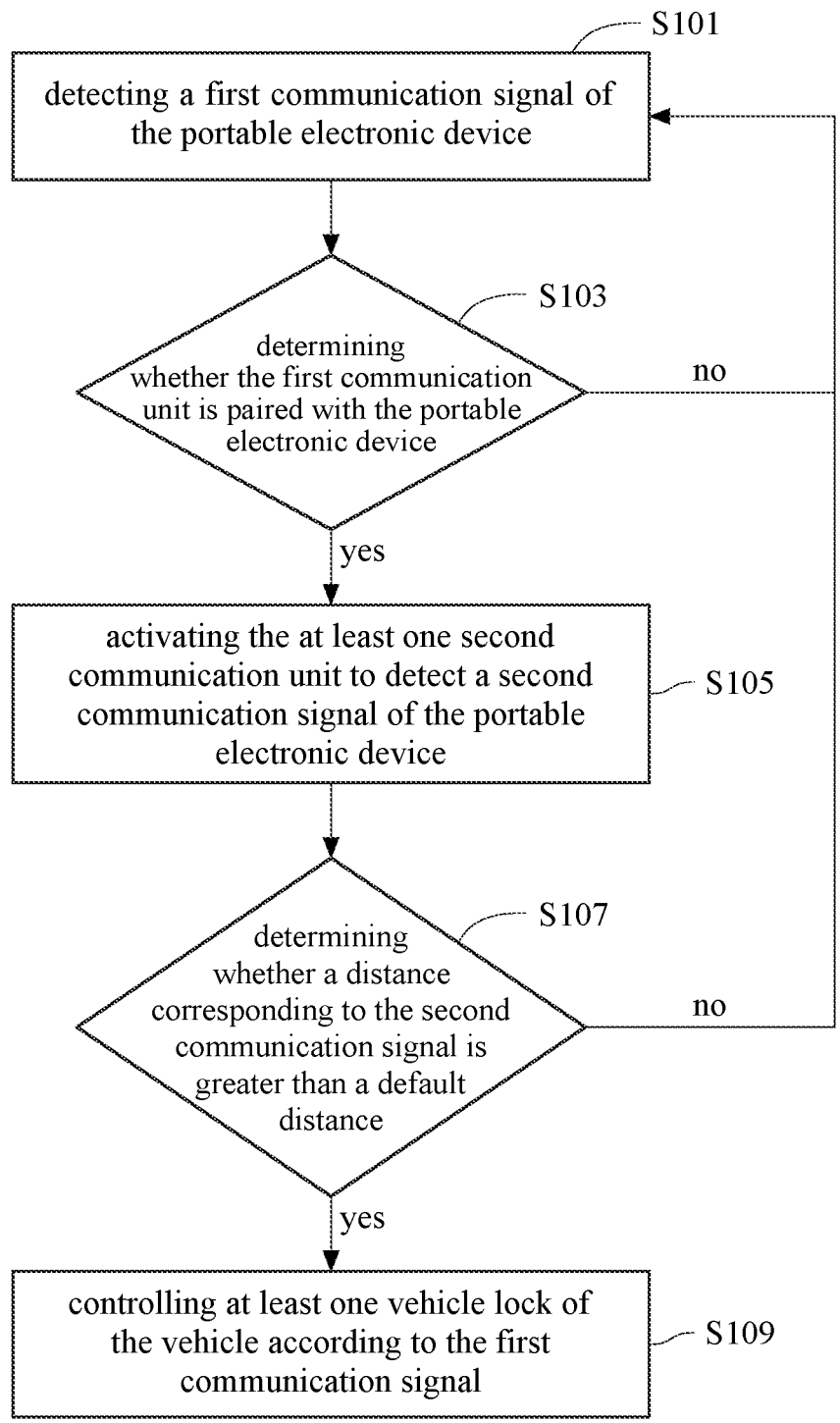
FIG. 2 is a flowchart illustrating an operation of a wireless vehicle control device according to an embodiment of the present disclosure.

Please refer to FIG. 1 and FIG. 2, wherein FIG. 2 is a flowchart illustrating an operation of a wireless vehicle control device according to an embodiment of the present disclosure. As shown in FIG. 2, the operation method of the wireless vehicle control device 1 includes: step S101: detecting a first communication signal of the portable electronic device; step S103: determining whether the first communication unit is paired with the portable electronic device; if the determination result of step S103 is "no", performing step S101; if the determination result of step S103 is "yes", performing step S105: activating the at least one second communication unit to detect a second communication signal of the portable electronic device; step S107: determining whether a distance corresponding to the second communication signal is greater than a default distance; if the determination result of step S107 is "no", performing step S101; and if the determination result of step S107 is "yes", performing step S109: controlling at least one vehicle lock of the vehicle according to the first communication signal.

In step S101 and step S103, the central management unit 10 activates the first communication unit 11 to detect the first communication signal output by the portable electronic device A, and determines whether the first communication unit 11 is paired with the portable electronic device A according to the first communication signal, wherein the first communication signal indicates that the first communication unit 11 detects that the portable electronic device A is within the communication range of the first communication unit 11. For example, the first communication signal may include identification data of the portable electronic device A, and the central management unit 10 may determine whether the identification data of the portable electronic device A is authorized identification data in step S103. Said identification data is, for example, an identification code (identifier).

If the identification data of the portable electronic device A is not the authorized identification data, the central management unit 10 may determine that the portable electronic device A is not paired with the first communication unit 11 and perform step S101 again; if the identification data of the portable electronic device A is the authorized identification data, the central management unit 10 may determine that the portable electronic device A is paired with the first communication unit 11 and then perform step S105. The identification data is, for example, a device number/device ID, serial number etc. of the portable electronic device A, the present disclosure is not limited thereto. Specifically, when a distance between the portable electronic device A and the first communication unit 11 is not greater than a first default distance, the central management unit 10 performs verification according to the identification data of the portable electronic device A, and determines that the portable electronic device A is paired with the first communication unit 11 when the verification is successful, wherein the first default distance is, for example, 15 meters.

In step S105, the central management unit 10 activates the second communication unit 12 to detect the second communication signal of the portable electronic device A, wherein the second communication signal indicates that the second communication unit 12 detects the portable electronic device A is within the communication range of the second communication unit 12.

In step S107, the activated second communication unit 12 outputs signal, the central management unit 10 calculates a distance between the portable electronic device A and the second communication unit 12 according to time of flight (TOF) corresponding to the second communication signal when receiving the second communication signal response by the portable electronic device A, and determines whether said distance is not greater than a second default distance. The second default distance is, for example, 5 meters, the present disclosure is not limited thereto.

If the central management unit 10 determines that the distance corresponding to the second communication signal is not greater than the second default distance, the central management unit 10 performs step S109 to control one or more vehicle locks of the vehicle disposed with the wireless vehicle control device 1 according to the first communication signal, wherein said control performed by the central management unit 10 may include locking the vehicle door or unlocking the vehicle door, and the second default distance may be 5 meters. For example, the first communication signal may further include a key command which indicates the locking or unlocking of the vehicle lock. On the contrary, if the central management unit 10 determines that the distance corresponding to the second communication signal is greater than the second default distance, it means that the portable electronic device A and the vehicle are not close enough, and the central management unit 10 performs step S101 again. In addition, the first communication signal may further include an activation command, and after step S109, the central management unit 10 may further start the vehicle according to the first communication signal when determining that the distance between the portable electronic device A and the vehicle (for example, the distance between the portable electronic device A and the wireless vehicle control device 1) is not greater than a third default distance, wherein the third default distance is, for example, 1 meter.

Figure 3:
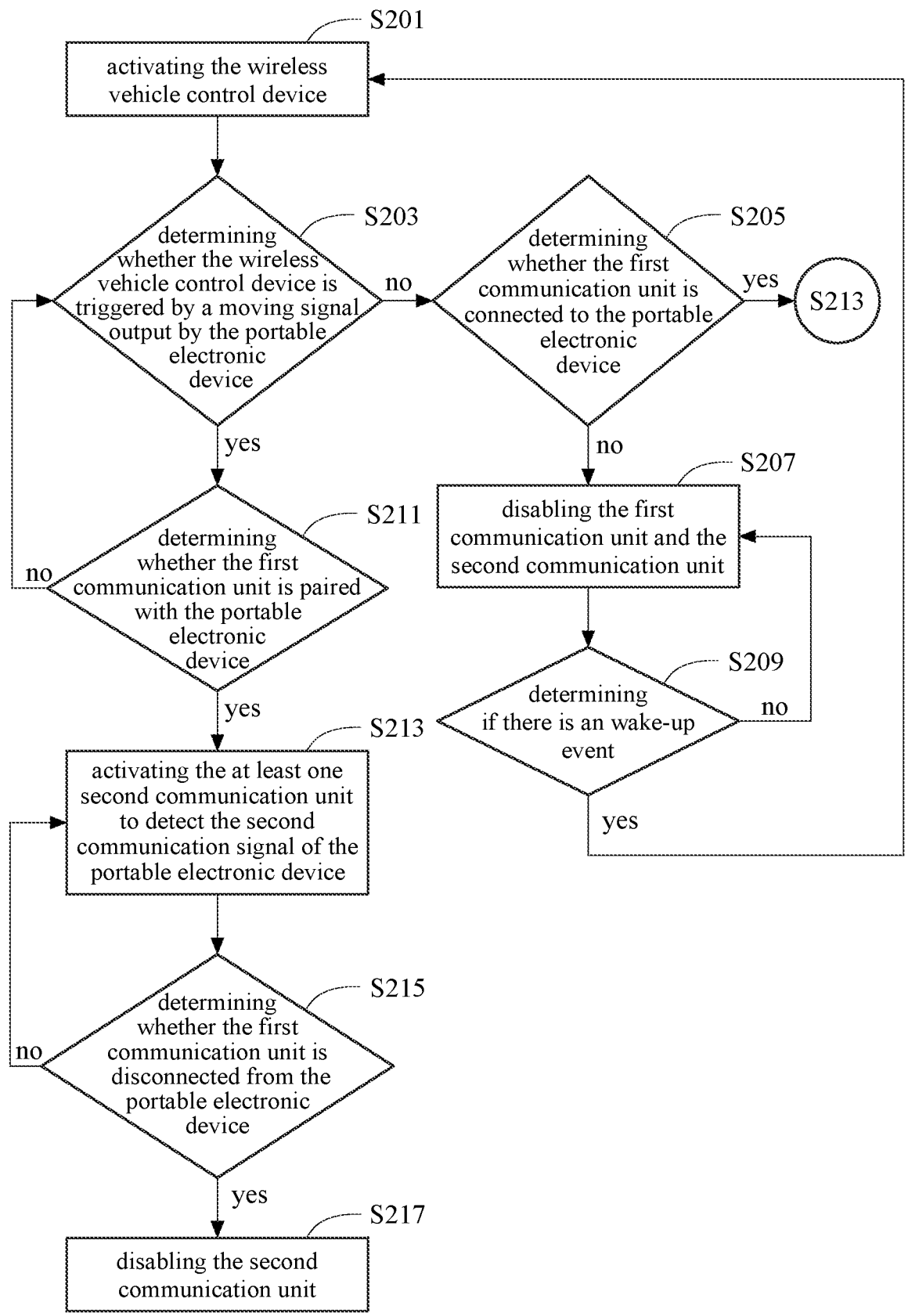
FIG. 3 is a flowchart illustrating an operation of a wireless vehicle control device according to another embodiment of the present disclosure.

Please refer to FIG. 1 and FIG. 3, wherein FIG. 3 is a flowchart illustrating an operation of a wireless vehicle control device according to another embodiment of the present disclosure. As shown in FIG. 3, the operation method of the wireless vehicle control device according to another embodiment of the present disclosure may include: step S201: activating the wireless vehicle control device; step S203: determining whether the wireless vehicle control device is triggered by a moving signal output by the portable electronic device; if the determination result of step S203 is "no", performing step S205: determining whether the first communication unit is connected to the portable electronic device; if the determination result of step S205 is "no", performing step S207: disabling the first communication unit and the second communication unit; step S209: determining if there is an wake-up event; if the determination result of step S209 is "no", performing step S207; if the determination result of step S209 is "yes", performing step S201; if the determination result of step S203 is "yes", performing step S211: determining whether the first communication unit is paired with the portable electronic device; if the determination result of step S211 is "no", performing step S203; if the determination result of step S211 is "yes", performing step S213: activating the at least one second communication unit to detect the second communication signal of the portable electronic device; step S215: determining whether the first communication unit is disconnected from the portable electronic device; if the determination result of step S215 is "no", performing step S213; and if the determination result of step S215 is "yes", performing step S217: disabling the second communication unit. Steps S211 and S213 of FIG. 3 are respectively the same as steps S103 and S105 of FIG. 2, their repeated descriptions are omitted herein.

In step S201, the wireless vehicle control device 1 may be activated by being powered on. When the wireless vehicle control device 1 is activated, the central management unit 10 may detect the moving signal output by the portable electronic device A; activate the first communication unit 11;

and disable the second communication unit 12. In step S203. the central management unit 10 determines whether the moving signal output by the portable electronic device A is received. It should be noted that the portable electronic device A may be installed with application and is disposed with a gyro, and the moving signal may be a signal generated when the gyro in the portable electronic device A senses movement of the portable electronic device A, and then the portable electronic device A outputs the moving signal to the wireless vehicle control device 1 through the application.

If the central management unit 10 is not triggered by the moving signal, then in step S205, the central management unit 10 determines whether the first communication unit 11 is connected to the portable electronic device A. If the first communication unit 11 is connected to the portable electronic device A, the central management unit 10 performs step S213, wherein step S213 is described later; if the first communication unit 11 is not connected to the portable electronic device A, in step S207, the central management unit 10 disables the first communication unit 11 and the second communication unit 12, thereby lowering power consumption of the wireless vehicle control device 1. Then, in step S209, the central management unit 10 determines whether there is a wake-up event. For example, the wireless vehicle control device 1 may be set with an activation button, the wake-up event may be an event where said activation button pushed by a user. If there is no wake-up event, the central management unit 10 performs step S207 again; if the wake-up event occurs, the central management unit 10 performs step S201 again.

Please refer back to step S203, if the central management unit 10 is triggered by the moving signal, then in step S211, the central management unit 10 performs step S211 and step S213. If the determination result of step S211 is "no", the central management unit 10 performs step S203 again to determine whether the central management unit 10 is triggered by another moving signal.

In step S215, the central management unit 10 determines whether the first communication unit 11 is disconnected from the portable electronic device A. If the first communication unit 11 is not disconnected from the portable electronic device A, meaning the first communication unit 11 is still connected to the portable electronic device A, the central management unit 10 performs step S213 again; if the first communication unit 11 is disconnected from the portable electronic device A, meaning the portable electronic device A and the wireless vehicle control device 1 (the vehicle) are too far away from each other, the central management unit 10 performs step S217 to disable the second communication unit 12.

Said "disable" in the above embodiment may refer to pausing power supply to the unit, or putting the unit into standby. In addition, after step S213, the central management unit 10 may then perform steps S215 and S217, the central management unit 10 may also then perform steps S107 and S109 of FIG. 2.

Figure 4:
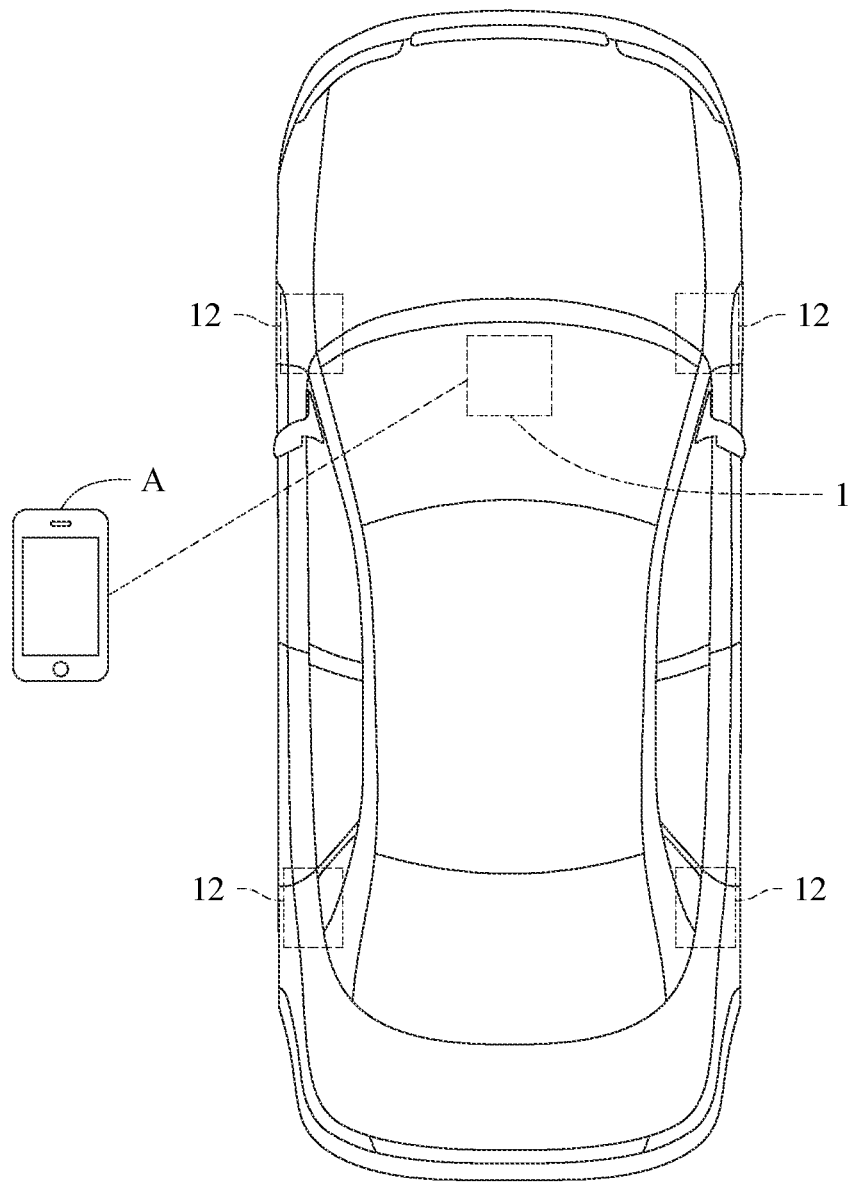
FIG. 4 is a schematic diagram illustrating a vehicle, the wireless vehicle control device and a portable electronic device.

To further explain step S109 of FIG. 2, please refer to FIG. 4, wherein FIG. 4 is a schematic diagram illustrating a vehicle, the wireless vehicle control device and a portable electronic device. As shown in FIG. 4, the wireless vehicle control device 1 may be disposed within the vehicle, and may be disposed between the driver's seat and the passenger seat. Said at least one vehicle lock may be a plurality of vehicle locks, the second communication unit 12 may be a plurality of second communication units 12 disposed at the four corners of the vehicle respectively, and the second communication units 12 are close to their respective vehicle locks. The second communication units 12 generate their respective second communication signals, the central management unit 10 calculates distance between the portable electronic device A and each of the second communication units 12 according to the corresponding one of the second communication signals, and controls the vehicle lock corresponding to one of the distances of the second communication units 12 that is not greater than the default distance.

In short, according to the distance between the portable electronic device A and each second communication unit 12 as well as the first communication signal, the central management unit 10 may control the vehicle lock with the shortest distance. For example, assuming that the portable electronic device A has a shortest distance with the second communication unit 12 disposed near the passenger seat, the implementation of step S109 of FIG. 2 may be the central management unit 10 controlling the vehicle lock at the passenger side according to the first communication signal.

Figure 5:
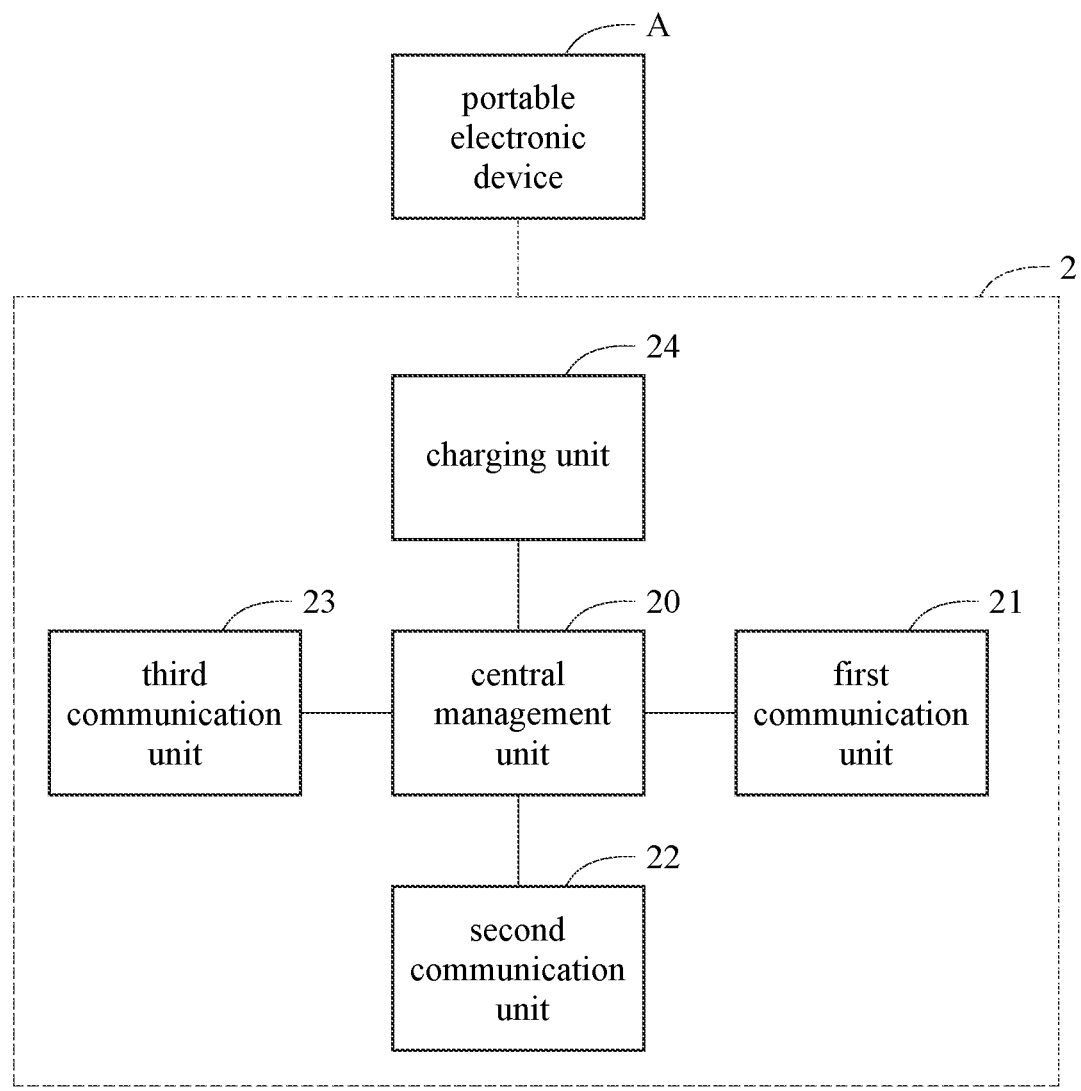
FIG. 5 is a block diagram illustrating a wireless vehicle control device according to another embodiment of the present disclosure.

Please refer to FIG. 5, wherein FIG. 5 is a block diagram illustrating a wireless vehicle control device according to another embodiment of the present disclosure. As shown in FIG. 5, the wireless vehicle control device 2 includes a central management unit 20, a first communication unit 21, a second communication unit 22, a third communication unit 23 and a charging unit 24. The wireless vehicle control device 2 is disposed in the vehicle. The central management unit 20 is connected to the first communication unit 21, the second communication unit 22, the third communication unit 23 and the charging unit 24. The wireless vehicle control device 2 may be in communication connection with the portable electronic device A, wherein the dotted line between the portable electronic device A and the wireless vehicle control device 2 indicates that the two communicate with each other when they are close to each other. The wireless vehicle control device 2 may be configured to perform the embodiments of FIG. 2 and FIG. 3. The central management unit 20, the first communication unit 21 and the second communication unit 22 of the wireless vehicle control device 2 are the same as the central management unit 10, the first communication unit 11 and the second communication unit 12 of the wireless vehicle control device 1 of FIG. 1. respectively, their repeated descriptions are omitted herein.

The third communication unit 23 may be a near field communication (NFC) unit and include a NFC transceiver and a NFC coil module, and is connected to at least one NFC coil. The charging unit 24 may include a wireless charging unit and a multi-coil module. The third communication unit 23 is configured to obtain a third communication signal of the portable electronic device A, wherein the third communication signal may be a signal generated by the mutual induction between the coil in the third communication unit 23 and the coil in the portable electronic device A. The charging unit 24 is configured to charge external devices (for example, the portable electronic device A). In other words, the central management unit 20 may control the charging unit 24 in coordination with the portable electronic device A to perform charging operation according to the third communication signal. When the third communication unit 23 obtains the third communication signal, it means that the portable electronic device A is close enough to the third communication unit 23 and the charging unit 24, and the central management unit 20 may control the charging unit 24 to charge the portable electronic device A.

Further, the central management unit 20 may further control the third communication unit 23 to perform foreign object detection (FOD) on a receiving coil of the portable electronic device A after controlling the charging unit 24 to detect the receiving coil of the portable electronic device A, and control the charging unit 24 to charge the portable electronic device A when there is no foreign object. FOD may be used for detecting whether there are other coils on the portable electronic device A that are not the receiving coil. For example, FOD may be used to detect whether there are other NFC coils on the portable electronic device A. In addition, the charging unit 24 may also perform FOD on the receiving coil of the portable electronic device A to determine if there are any foreign metallic substances on the portable electronic device A. With this implementation, the central management unit 20 may determine whether the portable electronic device A is affected by foreign coils/metallic objects during charging and accordingly output a notification to the user device.

In addition, the central management unit 20 may further start the vehicle according to the third communication signal, wherein the third communication signal may include the identification data of the portable electronic device A and the activation command. In other words, when the central management unit 20 receives the third communication signal, it means that the distance between the portable electronic device A and the vehicle is not greater than the third default distance, and the central management unit 20 may start the vehicle when the verification of the identification data is successful.

The third communication unit 23 may be connected to a plurality of NFC coils corresponding to the vehicle locks of the vehicle, respectively. The NFC coils of the third communication unit 23 may be placed either directly at the door handle or in close proximity to the door handle. The third communication unit 23 generates the third communication signal corresponding to the NFC coil. The third communication signal may include the identification data of the portable electronic device A and the key command. The central management unit 20 may first determine whether the identification data matches previously authorized predetermined data. The central management unit 20 may, upon determining that the identification data matches the authorized predetermined data, control the NFC coil associated with one of the corresponding third communication signals in accordance with the key command to operate the vehicle lock. In other words, similar to the description of FIG. 4, the central management unit 20 may control the vehicle lock corresponding to the NFC coil connected to the third communication unit 23 that is the nearest to the portable electronic device A according to the third communication signal. Accordingly, when the portable electronic device A runs out of battery, the user may still open the car door by the sensing of the coil of the third communication unit 23.

Figure 6:
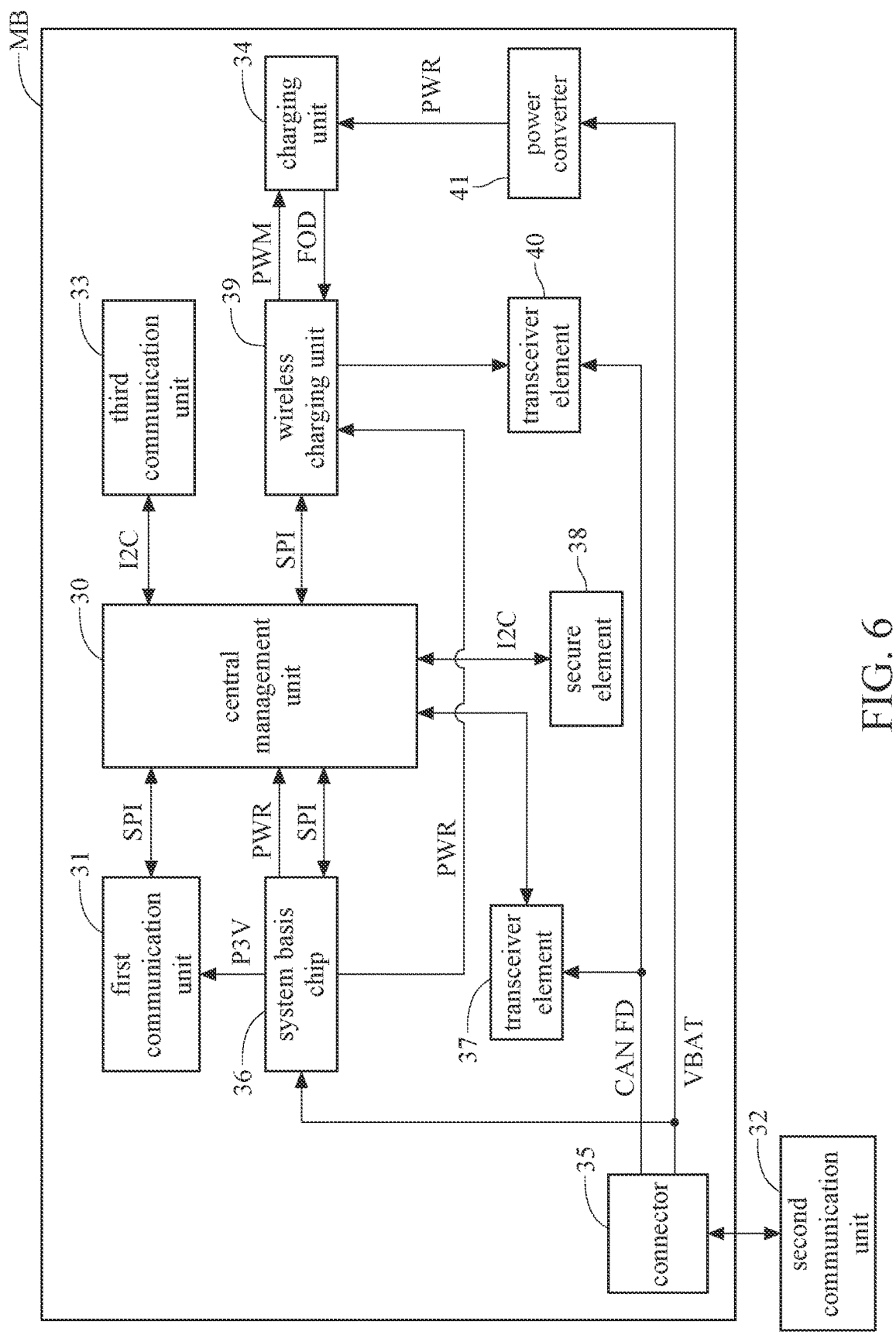
FIG. 6 is a block diagram illustrating a wireless vehicle control device according to one or more embodiments of the present disclosure.

Please refer to FIG. 6, wherein FIG. 6 is a block diagram illustrating a wireless vehicle control device according to one or more embodiments of the present disclosure. As shown in FIG. 6, the wireless vehicle control device 3 includes a central management unit 30, a first communication unit 31, a second communication unit 32, a third communication unit 33, a charging unit 34, a connector 35, a system basis chip 36, transceiver elements 37 and 40, a secure element 38, a wireless charging unit 39 and a power converter 41. The central management unit 30, the first communication unit 31, the third communication unit 33, the charging unit 34, the connector 35, the system basis chip 36, the transceiver elements 37 and 40, the secure element 38, the wireless charging unit 39 and the power converter 41 may all disposed on a same mainboard MB. The mainboard MB may be disposed on the console board between the driver's seat and the passenger seat.

The central management unit 30, the first communication unit 31, the second communication unit 32, the third communication unit 33 and the charging unit 34 of the wireless vehicle control device 3 are the same as the central management unit 20, the first communication unit 21, the second communication unit 22, the third communication unit 23 and the charging unit 24 of the wireless vehicle control device 2 of FIG. 5, respectively, their repeated descriptions are omitted herein.

The first communication unit 31 is connected to the central management unit 30 through serial peripheral interface bus (SPI). The second communication unit 32 is connected to the central management unit 30 through controller area network flexible data-rate (CAN FD) interface or CAN bus. The third communication unit 33 is connected to the central management unit 30 through integrated circuit interface (I2C). The charging unit 34 is connected to the wireless charging unit 39, and the wireless charging unit 39 is connected to the central management unit 30 through serial peripheral interface (SPI). The charging unit 34 receives pulse-width modulation (PWM) signal from the wireless charging unit 39, and transmits the charging condition (for example, result of FOD) to the wireless charging unit 39. The connector 35 may be configured to transmit the signal generated by the wireless vehicle control device 3 to an in-car computer, and transmit the signal generated by the in-car computer to the corresponding unit/element on the wireless vehicle control device 3.

The system basis chip 36 may be a power management IC (PMIC) and is connected to the central management unit 30 through SPI. The system basis chip 36 is configured to provide power to the wireless vehicle control device 3 and perform power management. The system basis chip 36 may provide power (PWR) to the central management unit 30 and the wireless charging unit 39, and provide signal P3V to the first communication unit 31. The signal P3V may be a signal of +3.3V, and may be used as the power source of the first communication unit 11. The transceiver element 37 may be a local interconnect network (LIN) transceiver. The secure element 38 is configured to perform encryption algorithm and decryption algorithm for the first communication signal and the third communication signal, such as asymmetric algorithm. The wireless charging unit 39 may be configured to charge the portable electronic device A with wireless charging function or other electronic devices, detect charging condition (for example, detecting overheating or overvoltage), and stop power supply of the wireless charging unit 39 when the charging condition indicates abnormality. The transceiver element 40 is connected to the connector 35 through CAN FD interface or CAN bus, and is connected to the wireless charging unit 39, for the wireless charging unit 39 to transmit signal to the connector 35. The power converter 41 receives power provided by voltage battery (VBAT) from the connector 35 and transmits power (PWR) used for charging to the charging unit 34. In other words, the voltage battery may be used as the source of battery power of the vehicle. The power converter 41 may be configured to buck voltage of DC/DC converter, and transmit power (PWR) to the charging unit 34.

The wireless vehicle control device of the present disclosure may be applied to in-vehicle devices, such as self-driving cars, electric vehicles, or semi-autonomous vehicles etc. In view of the above description, the wireless vehicle control device according to one or more embodiments of the present disclosure may accurately detect the movement of a pairable portable electronic device to control the vehicle lock based on control signals output by the portable electronic device at an appropriate distance. According to one or more embodiments of the present disclosure, the wireless vehicle control device utilizes near-field communication technology, allowing users to open the car door even if their mobile device runs out of power. Furthermore, the wireless vehicle control device according to one or more embodiments of the present disclosure not only provides door unlocking functionality but also features charging and foreign object detection capabilities, thereby simultaneously determining whether the portable electronic device is affected by foreign coils/metallic objects while charging, and outputting notification to the user device accordingly. Additionally, by disabling communication units, the overall power consumption of the wireless vehicle control device can be reduced.

What is claimed is:

1. A wireless vehicle control device, disposed on a vehicle, comprising:
   a first communication unit configured to detect a first communication signal of a portable electronic device;
   at least one second communication unit configured to detect a second communication signal of the portable electronic device, wherein a communication range of the at least one second communication unit is smaller than a communication range of the first communication unit;
   a central management unit connected to the first communication unit and the at least one second communication unit, wherein the central management unit is configured to activate the at least one second communication unit to perform detection when determining the first communication unit is paired with the portable electronic device according to the first communication signal, and the central management unit is configured to control at least one vehicle lock according to the first communication signal when a distance corresponding to the second communication signal is not greater than a default distance;
   a third communication unit connected to the central management unit, and configured to obtain a third communication signal of the portable electronic device; and
   a charging unit connected to the central management unit, wherein the central management unit is further configured to control the charging unit in coordination with the portable electronic device to perform a charging operation based on the third communication signal.

2. The wireless vehicle control device according to claim 1, wherein before determining the first communication unit is paired with the portable electronic device according to the first communication signal, the central management unit is further configured to activate the first communication unit when triggered by a moving signal output by the portable electronic device.

3. The wireless vehicle control device according to claim 1, wherein the central management unit further configured to control the charging unit in coordination with the portable electronic device to perform the charging operation based on the third communication signal is: the central management unit controlling the third communication unit to perform a foreign object detection on a receiving coil of the portable electronic device and controlling the charging unit to charge the portable electronic device after controlling the charging unit to detect the receiving coil.

4. The wireless vehicle control device according to claim 1, wherein the at least one second communication unit is a plurality of second communication units, the at least one vehicle lock is a plurality of vehicle locks, the plurality of second communication units correspond to the plurality of vehicle locks respectively, the plurality of second communication units generate the respective second communication signal, the central management unit calculates a plurality of distances according to the second communication signals, and controls one of the plurality of vehicle locks corresponding to one of the plurality of second communication units with the distance not greater than the default distance.

5. The wireless vehicle control device according to claim 1, wherein the central management unit is further configured to start the vehicle according to the third communication signal.

6. The wireless vehicle control device according to claim 1, wherein the third communication unit is a near field communication unit.

7. The wireless vehicle control device according to claim 1, wherein the first communication unit is a Bluetooth communication unit, and the at least one second communication unit is at least one ultra-wideband communication unit.

8. The wireless vehicle control device according to claim 1, wherein the third communication signal comprises identification data, and controlling the at least one vehicle lock according to the first communication signal is performed when the central management unit determining that the identification data matches predetermined data.

9. The wireless vehicle control device according to claim 1, wherein the first communication unit, the third communication unit and the charging unit are disposed on a same mainboard.

* * * * *